United States Patent
Taguchi

(10) Patent No.: US 10,773,391 B2
(45) Date of Patent: Sep. 15, 2020

(54) CONTROL DEVICE AND ROBOT SYSTEM

(71) Applicant: Seiko Epson Corporation, Tokyo (JP)

(72) Inventor: Makoto Taguchi, Matsumoto (JP)

(73) Assignee: Seiko Epson Corporation (JP)

( * ) Notice: Subject to any disclaimer, the term of this patent is extended or adjusted under 35 U.S.C. 154(b) by 328 days.

(21) Appl. No.: 15/872,085

(22) Filed: Jan. 16, 2018

(65) Prior Publication Data

US 2018/0200893 A1    Jul. 19, 2018

(30) Foreign Application Priority Data

Jan. 17, 2017  (JP) ................................ 2017-005638
May 18, 2017  (JP) ................................ 2017-098735
Oct. 31, 2017  (JP) ................................ 2017-210106

(51) Int. Cl.
*B25J 13/08* (2006.01)
*B25J 9/16* (2006.01)
*G05B 15/02* (2006.01)
*B25J 9/00* (2006.01)

(52) U.S. Cl.
CPC .......... *B25J 13/085* (2013.01); *B25J 9/1633* (2013.01); *B25J 9/1669* (2013.01); *B25J 9/1687* (2013.01); *B25J 9/1694* (2013.01); *G05B 15/02* (2013.01); *B25J 9/0096* (2013.01); *G05B 2219/40033* (2013.01); *Y10S 901/09* (2013.01); *Y10S 901/30* (2013.01); *Y10S 901/46* (2013.01)

(58) Field of Classification Search
CPC .............. B25J 13/08; B25J 9/16; G05B 15/02
See application file for complete search history.

(56) References Cited

U.S. PATENT DOCUMENTS

| | | | |
|---|---|---|---|
| 2014/0121837 A1* | 5/2014 | Hashiguchi | B25J 9/0087 700/261 |
| 2014/0188281 A1* | 7/2014 | Nagai | G05B 19/425 700/264 |
| 2018/0207755 A1* | 7/2018 | Yamane | B25J 9/1697 |

FOREIGN PATENT DOCUMENTS

JP          09-136279 A       5/1997

\* cited by examiner

*Primary Examiner* — Kira Nguyen
(74) *Attorney, Agent, or Firm* — Harness, Dickey & Pierce, P.L.C.

(57) ABSTRACT

A control device includes a processor that is configured to execute computer-executable instructions so as to control a robot provided with a manipulator, wherein in a case where the processor is configured to cause an end effector connected to the manipulator assemble a first object held by the end effector to a second object and a third object, the processor is configured to: cause the first object to come into contact with at least one of the second object and the third object; rotate the first object around a second rotation axis intersecting a first rotation axis while rotating the first object around the first rotation axis to assemble the second object and the first object to each other; and thereafter, rotate the first object around a third rotation axis intersecting the first rotation axis to assemble the third object and the first object to each other.

20 Claims, 8 Drawing Sheets

CONTROL DEVICE AND ROBOT SYSTEM

BACKGROUND

1. Technical Field

The present invention relates to a control device, a robot system.

2. Related Art

An operation of matching phases of two bodies (a fitting workpiece and a fitted workpiece) with each other using a force control robot to fit the two bodies is studied (refer to JP-A-9-136279).

However, although the force control robot corresponds to the operation of matching the phases of the two bodies with each other, the force control robot does not correspond to an operation of matching phases of three (and four or more) bodies with each other.

Accordingly, in the related art, an operation of matching phases of two (and three or more) bodies with a phase of one body using a robot cannot be performed. In the related art, in a case where misalignment occurs in bodies (in the related art, two bodies) to be assembled in the robot, it is difficult to fit the bodies to each other or the bodies may not be fitted to each other.

As described above, in the related art, it is difficult to effectively perform an operation of matching phases of two (or three or more) bodies with a phase of one body to assemble the two (and three or more) bodies to the one body in a robot.

SUMMARY

An aspect of the invention is directed to a control device includes a processor that is configured to execute computer-executable instructions so as to control a robot provided with a manipulator, wherein in a case where the processor is configured to cause an end effector connected to the manipulator assemble a first object held by the end effector to a second object and a third object, the processor is configured to: cause the first object to come into contact with at least one of the second object and the third object; rotate the first object around a second rotation axis intersecting a first rotation axis while rotating the first object around the first rotation axis to assemble the second object and the first object to each other; and thereafter, rotate the first object around a third rotation axis intersecting the first rotation axis to assemble the third object and the first object to each other.

According to this configuration, in the control device, in the case where the control unit assembles the first object held by the holding portion provided in the movable portion of the robot to the second object and the third object, the control unit causes the first object to come into contact with at least one of the second object and the third object, rotates the first object around the second rotation axis intersecting the first rotation axis while rotating the first object around the first rotation axis to assemble the second object and the first object to each other, and thereafter, rotates the first object around the third rotation axis intersecting the first rotation axis to assemble the third object and the first object to each other. Therefore, according to the control device, in the robot, it is possible to effectively perform an operation of matching phases of two bodies with a phase of one body to assemble the two bodies to the one body.

For example, in the robot, the control device may be applied to an operation of matching phases of three or more bodies with the phase of one body to assemble the three or more bodies to the one body.

The aspect of the invention may be configured such that, in the control device, the processor is configured to cause to the end effector to assemble the first object to the second object and the third object by a force control based on an output from a force sensor connected to the manipulator.

According to this configuration, the control unit assembles the first object to the second object and the third object by the force control based on the output from the force sensor connected to the manipulator. Therefore, according to the control device, in the robot, it is possible to effectively perform the operation of matching the phases of two bodies with the phase of one body to assemble the two bodies to the one body using the force control.

The aspect of the invention may be configured such that, in the control device, the processor is configured to perform the force control in a state where a target force in an axial direction of the first rotation axis is set to a value other than 0 while rotating the first object around the first rotation axis.

According to this configuration, the control device performs the force control in the state where the target force in the axial direction of the first rotation axis is set to a value other than 0 while rotating the first object around the first rotation axis. Therefore, according to the control device, in the robot, it is possible to effectively perform the operation of matching the phases of two bodies with the phase of one body to assemble the two bodies to the one body using the force control in which the target force is determined.

The aspect of the invention may be configured such that, in the control device, the processor is configured to perform the force control in a state where a target force in a rotation around the second rotation axis and a target force in a rotation around the third rotation axis are set to be smaller than a target force in an axial direction of the first rotation axis.

According to this configuration, the control device performs the force control in the state where the target force in the rotation around the second rotation axis and the target force in a rotation around the third rotation axis are set to be smaller than the target force in the axial direction of the first rotation axis. Therefore, according to the control device, in the robot, it is possible to effectively perform the operation of matching the phases of two bodies with the phase of one body to assemble the two bodies to the one body using the force control in which the target force is determined.

The aspect of the invention may be configured such that, in the control device, the processor is configured to perform the force control in a state where the target force in the rotation around the second rotation axis and the target force in the rotation around the third rotation axis are set to 0.

According to this configuration, the control device performs the force control in the state where the target force in the rotation around the second rotation axis and the target force in the rotation around the third rotation axis are set to 0. Therefore, according to the control device, in the robot, it is possible to effectively perform the operation of matching the phases of two bodies with the phase of one body to assemble the two bodies to the one body using the force control in which the target force is determined.

The aspect of the invention may be configured such that, in the control device, the processor is configured to perform the force control in a state where a target force in an axial direction of a fourth rotation axis intersecting the first rotation axis is set to a value other than 0 while rotating the first object around the first rotation axis.

According to this configuration, the control device performs the force control in the state where the target force in the axial direction of the fourth rotation axis intersecting the first rotation axis is set to a value other than 0 while rotating the first object around the first rotation axis. Therefore, according to the control device, in the robot, the first object is rotated while being pressed in the direction of the axis other than the rotation axis, and thus, it is possible to effectively perform the operation of matching the phases of two bodies with the phase of one body to assemble the two bodies to the one body.

The aspect of the invention may be configured such that, in the control device, when the processor is configured to change an axial direction of the first rotation axis to a direction after the assembling, the processor is configured to perform the force control in a state where target force in an axial direction of a fifth rotation axis intersecting the first rotation axis is set to a value other than 0.

According to this configuration, when the control unit changes the axial direction of the first rotation axis in the direction after the assembling, the control unit performs the force control in a state where the target force in the axial direction of the fifth rotation axis intersecting the first rotation axis is set to a value other than 0. Therefore, according to the control device, in the robot, the first object is assembled in a state where the first object is fitted to a portion (a portion of the second object or the third object) of an object to be assembled is held, and thus, it is possible to effectively perform the operation of matching the phases of two bodies with the phase of one body to assemble the two bodies to the one body.

The aspect of the invention may be configured such that, in the control device, when processor is configured to cause the first object to come into contact with at least one of the second object and the third object, the processor is configured to cause the first object to come into contact with at least one of the second object and the third object in a posture in which the first object is inclined with respect to a posture after the first object is assembled.

According to this configuration, when the control unit causes the first object to come into contact with at least one of the second object and the third object, the control unit causes the first object to come into contact with at least one of the second object and the third object in the posture in which the first object is inclined with respect to the posture after the first object is assembled. Therefore, according to the control device, in the robot, it is possible to prevent the first object from riding on the object (second object or third object) to be assembled, and thus, it is possible to effectively perform the operation of matching the phases of two bodies with the phase of one body to assemble the two bodies to the one body.

Another aspect of the invention is directed to a robot system A robot system including: a robot provided with a manipulator; a robot control device including a processor that is configured to execute computer-executable instructions so as to control the robot; and an end effector connected to the manipulator, wherein the in a case where the processor is configured to cause the end effector to assemble a first object held by the end effector to a second object and a third object, the processor is configured to: cause the first object to come into contact with at least one of the second object and the third object; rotate the first object around a second rotation axis intersecting a first rotation axis while rotating the first object around the first rotation axis to assemble the second object and the first object to each other, and thereafter; rotate the first object around a third rotation axis intersecting the first rotation axis to assemble the third object and the first object to each other.

According to this configuration, in the robot system, the robot is controlled by the above-described control device. Therefore, according to the robot system, in the robot, it is possible to effectively perform the operation of matching the phases of two bodies with the phase of one body to assemble the two bodies to the one body.

The aspect of the invention may be configured such that, in the robot system, the force sensor detects a force by a piezoelectric element.

According to this configuration, in the robot system, the force sensor detects the force by the piezoelectric element. Accordingly, in the robot system, it is possible to decrease errors and increase accuracy with respect to the force control.

The aspect of the invention may be configured such that, in the robot system, the piezoelectric element is quartz.

According to this configuration, in the control device, the piezoelectric element in the force sensor is quartz. Accordingly, in the robot system, it is possible to decrease errors and increase accuracy with respect to the force control.

The aspect of the invention may be configured such that, in the robot system, the axial direction of the fourth rotation axis is a direction approaching the second object or the third object.

According to this configuration, in the robot system, the axial direction of the fourth rotation axis is the direction approaching the second object or the third object. Therefore, according to the robot system, in the robot, the first object is rotated while being pressed to an object (second object or third object) to be assembled, and thus, it is possible to effectively perform the operation of matching the phases of two bodies with the phase of one body to assemble the two bodies to the one body.

The aspect of the invention may be configured such that, in the robot system, the second rotation axis is orthogonal to the first rotation axis.

According to this configuration, in the robot system, the second rotation axis is orthogonal to the first rotation axis. Therefore, according to the robot system, in the robot, the second rotation axis is orthogonal to the first rotation axis, and thus, it is possible to effectively perform the operation of matching the phases of two bodies with the phase of one body to assemble the two bodies to the one body.

The aspect of the invention may be configured such that, in the robot system, the third rotation axis is orthogonal to the first rotation axis.

According to this configuration, in the robot system, the third rotation axis is orthogonal to the first rotation axis. Therefore, according to the robot system, in the robot, the third rotation axis is orthogonal to the first rotation axis, and thus, it is possible to effectively perform the operation of matching the phases of two bodies with the phase of one body to assemble the two bodies to the one body.

The aspect of the invention may be configured such that, in the robot system, the first object, the second object, and the third object are gears.

According to this configuration, in the robot system, the first object, the second object, and the third object are gears. Therefore, according to the robot system, in the robot, it is possible to effectively perform the operation of matching the phases of two gears with the phase of one gear to assemble the two gears to the one gear.

According to the control device and the robot system according to the aspects of the invention, in the case where the processor is configured to cause an end effector connected to the manipulator assemble a first object held by the end effector to a second object and a third object, the processor is configured to: cause the first object to come into contact with at least one of the second object and the third object; rotate the first object around a second rotation axis intersecting a first rotation axis while rotating the first object around the first rotation axis to assemble the second object and the first object to each other; and thereafter, rotate the first object around a third rotation axis intersecting the first rotation axis to assemble the third object and the first object to each other. Therefore, in the control device and the robot system according to the aspects of the invention, it is possible to effectively perform the operation of matching the phases of two bodies with the phase of one body to assemble the two bodies to the one body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings.

First Embodiment

Robot System

Figure 1:
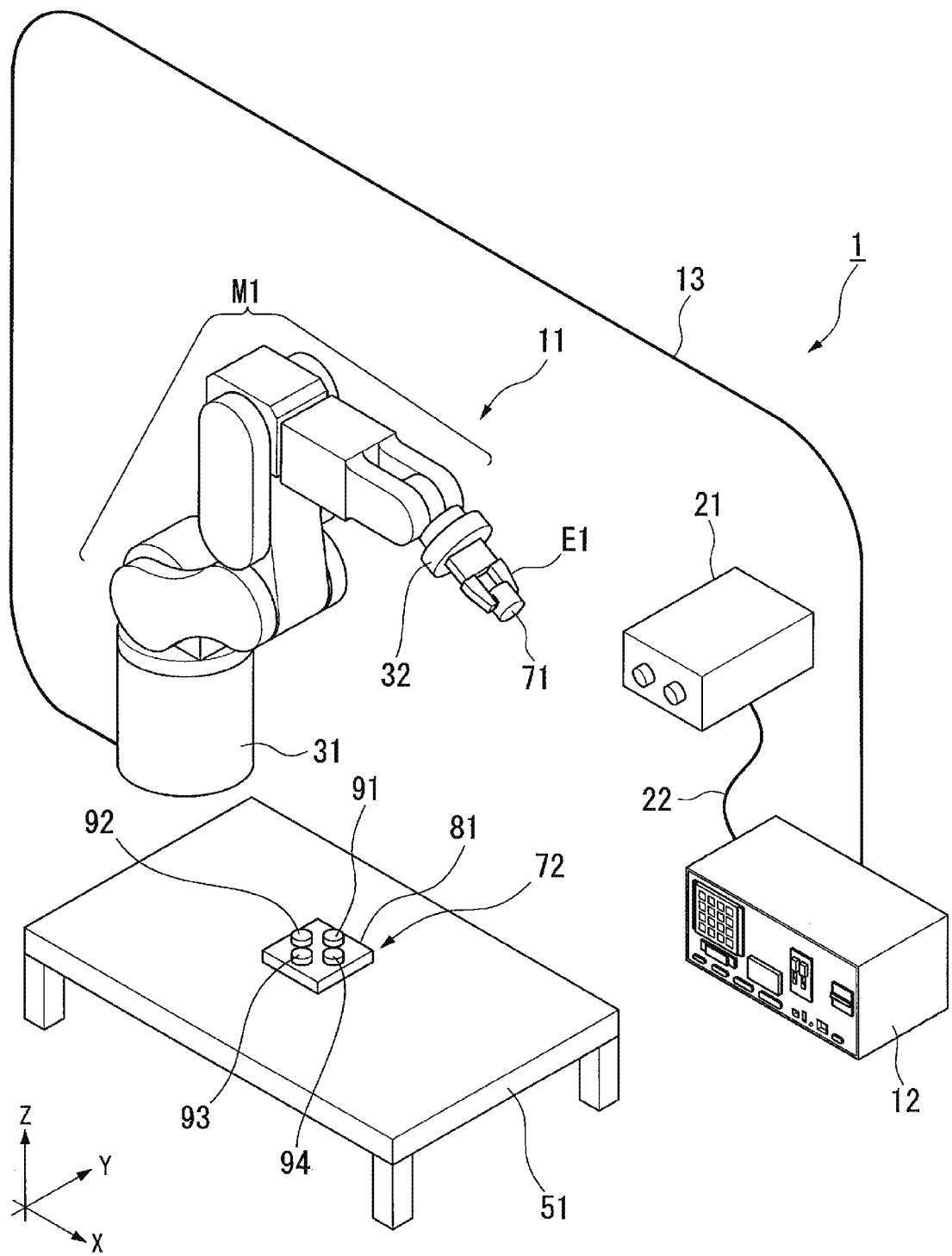
FIG. 1 is a view showing a schematic configuration example of a robot system according to an embodiment (first embodiment) of the invention.

FIG. 1 is a view showing a schematic configuration example of a robot system 1 according to an embodiment of the invention. In FIG. 1, for convenience of explanation, XYZ axes which are axes of three-dimensional orthogonal coordinates are shown. Here, for example, the XYZ axes may be used as axes of a robot coordinate system in a robot 11.

The robot system 1 includes the robot 11, a control device 12 (robot control device), a cable 13 which communicably connects the robot 11 and the control device 12 to each other, an imaging device 21, a cable 22 which communicably connects the imaging device 21 and the control device 12 to each other, a table 51, a gear 71 which is held by the robot 11, and a gear device 72 which is mounted on the table 51.

The gear device 72 includes a flat surface-shaped stand 81, and four gears 91 to 94 which are provided on one surface of the stand 81.

Here, one or more of table 51, gear 71, and gear device 72 may not be included in the robot system 1 and may be regarded as a configuration portion other than the robot system 1.

In the example of FIG. 1, details of a wire which connects the robot 11 and the control device 12 to each other are omitted, and only one cable 13 is shown. However, any wire may be used. Similarly, in the example of FIG. 1, details of a wire which connects the imaging device 21 and the control device 12 to each other are omitted, and only one cable 22 is shown. However, any wire may be used.

In the present embodiment (example of FIG. 1 and examples of FIGS. 3 to 11), a schematic shape (cylindrical shape) of each of the gears 71 and 91 to 94 is shown. However, in actual, the gears have teeth (gear teeth).

The robot 11 includes a base 31 (support stand), a manipulator (may be referred to as an "arm" or the like) M1 which is an example of a movable portion, a force detection portion 32 (force sensor), and an end effector E1 which is an example of a holding portion.

Here, in the present embodiment, the robot 11 is a single-arm robot.

In the example of FIG. 1, the robot 11 holds an object by the end effector E1. In the example of FIG. 1, the object is the gear.

In the present embodiment, the control device 12 is separately provided from the robot 11. As another configuration example, the control device 12 may be integrally provided with the robot 11, and for example, may be provided inside the base 31 of the robot 11.

In the present embodiment, a configuration for communicating via the wired cables 13 and 22 is shown. However, as configuration examples, with respect to one or more thereof, instead of the wired cables, a configuration for communicating via a wireless line may be used.

Imaging Device

For example, the imaging device 21 is configured of a camera.

The imaging device 21 captures an image and sends information of the captured image to the control device 12 via the cable 22.

In the present embodiment, the imaging device 21 is installed at a place where it is possible to capture a state of an operation performed by the robot 11.

Force Detection Portion

The force detection portion 32 is provided in the robot 11 and detects one or both of a received force and moment.

As another configuration example, instead of the force detection portion 32, a torque sensor may be used. In this case, the torque sensor may be provided at an arbitrary position of the manipulator M1 of the robot 11.

Here, as a preferable example of the force detection portion 32, a piezoelectric type force detection portion using a piezoelectric element for detecting the force or moment by detection of an electrical contact may be used. For example, compared to an electrostatic type force detection portion or a strain gauge type force detection portion, the piezoelectric type force detection portion has high rigidity and can decrease errors to improve accuracy. The high rigidity is a property that an amount of error (for example, in a case where a structure in which an elastic body is deformed according to the load is assumed, an amount of error corresponding to the amount of deformation) with respect to a load (force or moment) applied to the force detection portion decreases.

As a preferable example of the force detection portion 32, a force detection portion using quartz as a piezoelectric element may be used. Quartz is used as the piezoelectric element, and thus, for example, it is possible to decrease errors and improve accuracy.

Single-Arm Robot

The base 31 of the robot 11 is installed.

One end of the manipulator M1 of the robot 11 is connected to the base 31. The other end of the manipulator M1 of the robot 11 and the end effector E1 are connected to each other via the force detection portion 32 disposed therebetween.

The manipulator M1 of the robot 11 is a 6-axis vertical articulated structure and includes six joints. Each joint includes an actuator (not shown). In the robot 11, operations with degrees of freedom of six axes are performed by the operations of the respective actuators of the six joints. As another configuration example, a robot which performs operations with degrees of freedom of five axes or less may be used or a robot which performs operations with degrees of freedom of seven axes or more may be used.

For example, the end effector E1 of the robot 11 is a hand, includes a finger portion capable of pinching a body, and is an example of the holding portion. As another configuration example, the end effector E1 of the robot 11 may be arbitrary. For example, one which adsorbs a body using suction of air or one which brings a body by using a magnetic force may be used, and in this embodiment, these are also examples of the holding. That is, for example, the holding portion may include one which fixes the body to the holding portion by an arbitrary method.

Control Device

The control device 12 controls the robot 11. For example, the control device 12 each controls the respective actuators included in the manipulator M1, the force detection portion 32, and the end effector E1.

The control device 12 can control the imaging device 21.

The control device 12 receives information of a detection result from the force detection portion 32.

The control device 12 receives information of the image from the imaging device 21.

The control device 12 may control the robot 11 based on one or more among the information received from each of the force detection portion 32 and the imaging device 21.

Figure 2:
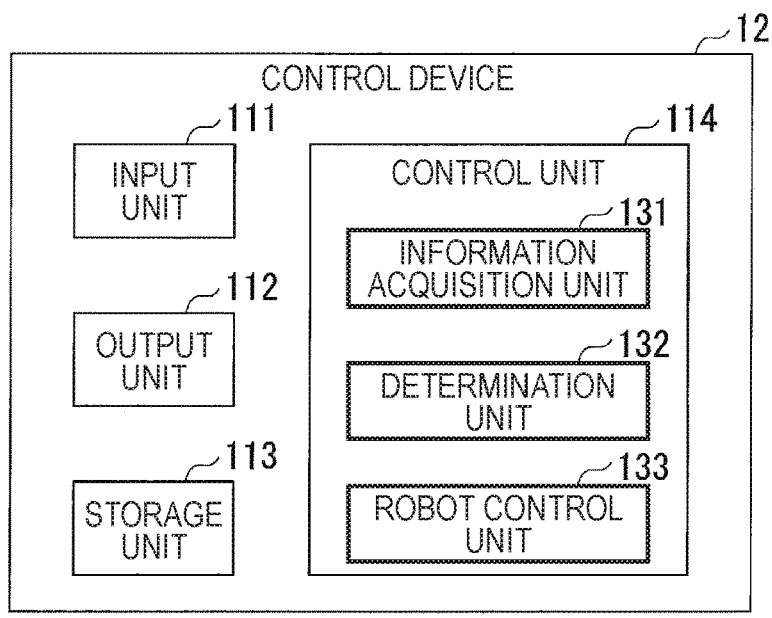
FIG. 2 is a view showing a schematic configuration example of a control device according to the embodiment (first embodiment) of the invention.

FIG. 2 is a view showing a schematic configuration example of the control device 12 according to the embodiment of the invention.

The control device 12 includes an input unit 111, an output unit 112, a storage unit 113, and a control unit 114.

The control unit 114 includes an information acquisition unit 131, a determination unit 132, and a robot control unit 133.

The input unit 111 inputs information from the outside. As an example, the input unit 111 includes an operation unit such as a keyboard or a mouse, and inputs information corresponding to a content of an operation performed by a user (person) with respect to the operation unit.

The output unit 112 outputs information to the outside. As an example, the output unit 112 displays and outputs information by a display unit. For example, the display unit is a display device having a screen and displays and outputs information to the screen. As another example, the output unit 112 may output information in other modes, and for example, may output the information by sound (including voice).

The storage unit 113 stores the information. As an example, the storage unit 113 stores a control program and information of various parameters which are used by the control unit 114. As another example, the storage unit 113 may store arbitrary information, and for example, may store information such as image used when controlling the robot 11.

The control unit 114 performs various controls in the control device 12. For example, the control unit 114 performs various controls based on the control program and the information of various parameters stored in the storage unit 113.

The information acquisition unit 131 acquires the information. For example, the information acquisition unit 131 acquires one or more of the information input by the input unit 111 and the information stored in the storage unit 113.

The determination unit 132 performs predetermined determination processing based on the information acquired by the information acquisition unit 131.

The robot control unit 133 controls the operation of the robot 11. Specifically, the robot control unit 133 communicates with the manipulator M1 via the cable 13 to control the operation of the manipulator M1. The robot control unit 133 communicates with the end effector E1 via the cable 13 to control the operation of the end effector E1.

Operation Performed by Robot

In the present embodiment, an operation of controlling the robot 11 by the control device 12 and moving the gear 71 held by the robot 11 to assemble the gear 71 to the four gears 91 to 94 provided on the stand 81 is performed. In this case, the robot 11 is controlled by the control device 12, and thus, a phase of the gear 71 held by the robot 11 and a phase of each of the four gears 91 to 94 are matched with each other.

For example, a position and a posture of the gear 71 (or other bodies) held by the end effector E1 of the robot 11 may be ascertained based on information of a position and a posture of a Tool Center Point (TCP) set to the robot 11.

Figure 3:
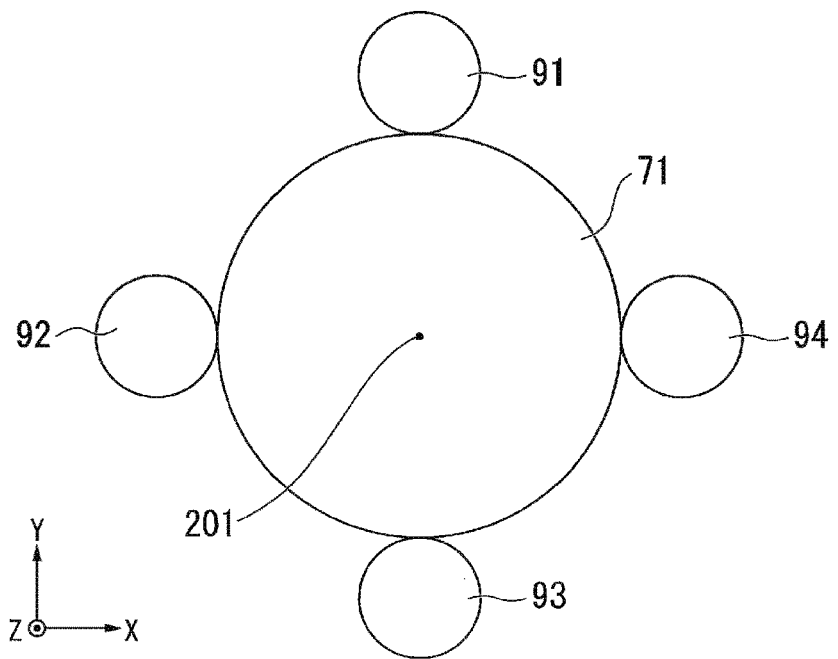
FIG. 3 is a view showing a schematic outline of a plurality of gears according to the embodiment (first embodiment) of the invention.

FIG. 3 is a view showing a schematic outline of the plurality of gears 71 and 91 to 94 according to the embodiment of the invention. FIG. 3 shows the XYZ coordinate axes similar to those shown in FIG. 1.

In the present embodiment, a negative direction in the Z axis is a direction of gravity and is a downward direction. A positive direction of the Z axis is an upward direction.

In the present embodiment, each of a surface of the table 51 in the upward direction and the stand 81 mounted on the surface has a surface parallel to an XY plane. The four gears 91 to 94 are disposed on the surface of the stand 81 in the upward direction.

In the present embodiment, each of the gears 71 and 91 to 94 has a circular shape (in actual, there are teeth in the gears) when viewed in the direction of the Z axis. The four gears 91 to 94 have the same shape as each other. The circular shape of the gear 71 is larger (a diameter of the circle is larger) than the circular shape of each of the four gears 91 to 94.

The four gears 91 to 94 are disposed at positions at which all the four gears 91 to 94 can engage (be fitted to) with the gear 71. More specifically, each of the four gears 91 to 94 is positioned at an equal distance from a center position 201 about a predetermined position (the center position 201) on an upper surface of the stand 81, and the four gears 91 to 94 are disposed on the surface at equal angular intervals in a direction of rotation about the center position 201. That is, each of the four gears 91 to 94 is disposed in the circle on the surface about the center position 201 to be rotationally symmetrical.

In the example of FIG. 3, the gear 71 and the four gears 91 to 94 are fitted to each other with their phase matched (with the teeth of the gears meshed). In this case, the center position of the circular shape of the gear 71 coincides with the above-described center position 201.

As the gear 71 or the gear device 72, gears having various configurations may be used.

For example, the number of the gears 91 to 94 included in the gear device 72 may be arbitrary.

A size or a shape of each of the gears 71 and 91 to 94 may be arbitrarily configured.

An operation of combining the plurality of gears 71 and 91 to 94 by the robot 11 will be described with reference to FIGS. 4 to 11 and 12. In FIGS. 4 to 11, the XYZ coordinate axes similar to those of FIG. 1 are shown.

FIGS. 4 to 11 are views showing an example of an operation of combining the plurality of gears 71 and 91 to 94 by the robot 11 according to the embodiment of the invention.

Here, in FIGS. 4 to 11, for easy understanding of the drawings, the robot 11 holding the gear 71 (particularly, the end effector E1) is not shown.

Figure 12:
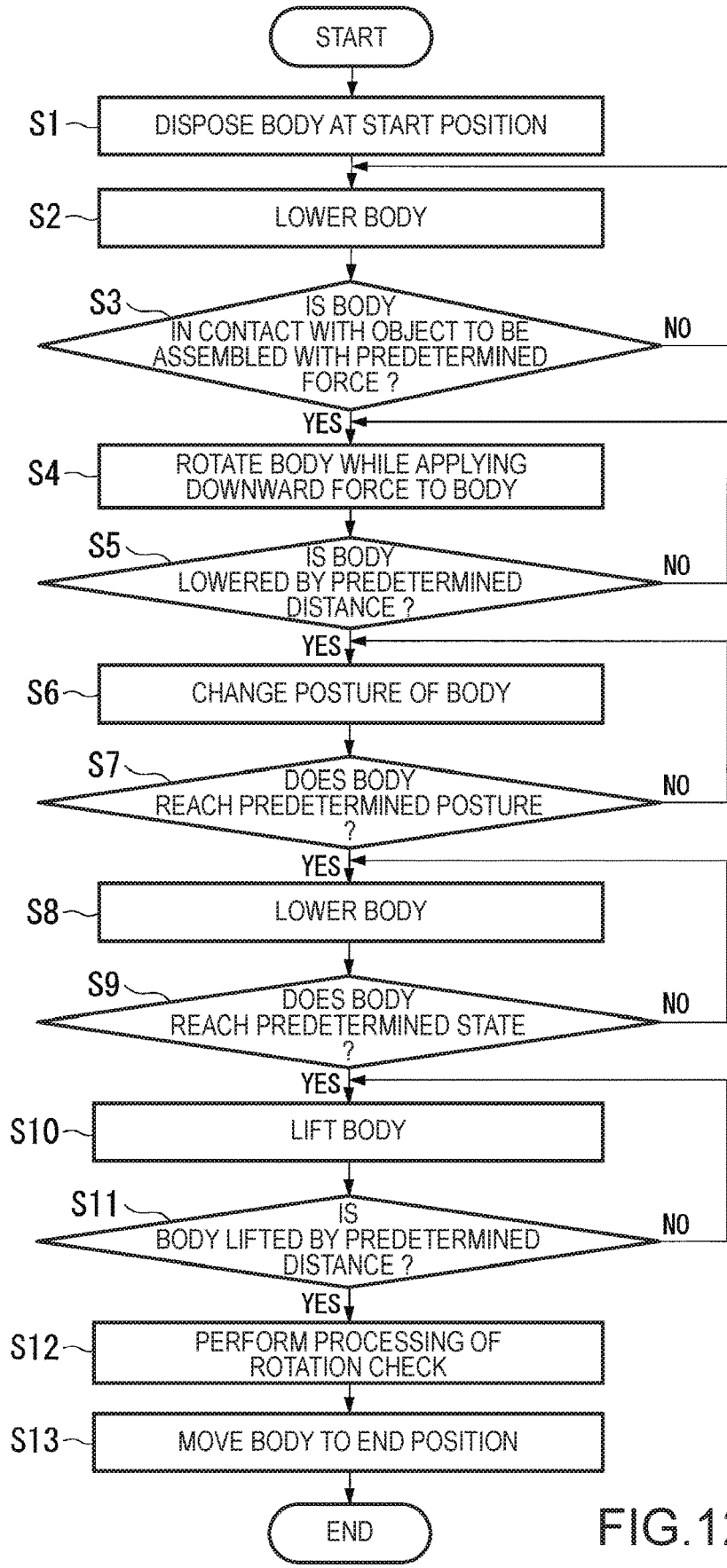
FIG. 12 is a view showing an example of a procedure of processing which is performed by the robot according to the embodiment (first embodiment) of the invention.

FIG. 12 is a view showing an example of a procedure of processing which is performed by the robot 11 according to the embodiment of the invention.

In the present embodiment, as a body which is held by the end effector E1 of the robot 11, the gear 71 is used. As an object (object to be assembled) to which the body is assembled, the gear device 72 (or the gears 91 to 94 of the gear device 72) is used. The gear 71 is an example of a first object. Any one of the gears 91, 92, 93, and 94 is an example of a second object. In a case where the gear 91 is an example of the second object, any one of the gears 92, 93, and 94 is an example of the third object. In a case where the gear 92 is an example of the second object, any one of the gears 91, 93, and 94 is an example of the third object. In a case where the gear 93 is an example of the second object, any one of the gears 91, 92, and 94 is an example of the third object. In a case where the gear 94 is an example of the second object, any one of the gears 91, 92, and 93 is an example of the third object.

In the present embodiment, it is assumed that the gear 71 is held by the end effector E1 of the robot 11. In a case where the gear 71 is not held by the end effector E1 of the robot 11, the control device 12 may control the robot 11 by the robot control unit 133 to hold the gear 71 by the end effector E1 of the robot 11.

In the present embodiment, it is assumed that the gear device 72 is installed on an upper surface of the table 51. In a case where the gear device 72 is not installed on the upper surface of the table 51, the control device 12 may control the robot 11 by the robot control unit 133 to hold and move the gear device 72 by the end effector E1 of the robot 11 so as to install the gear device 72 on the surface above the table 51.

Step S1

The control device 12 controls the robot 11 by the robot control unit 133 to dispose the gear 71 held by the end effector E1 of the robot 11 at a predetermined position (start position).

Here, for example, the control device 12 may ascertain the position of the gear device 72 in advance by teaching of a user or the like, or may detect and ascertain the position of the gear device 72 based on the information of the image captured by the imaging device 21.

Figure 4:
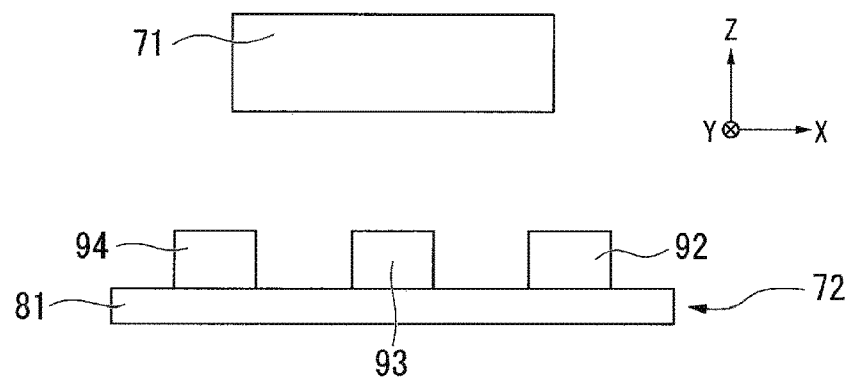
FIG. 4 is a view showing an example of the operation of combining the plurality of gears by a robot according to the embodiment (first embodiment) of the invention.

FIG. 4 shows a state where the gear 71 is disposed at the start position.

In this state, the center position of the circular shape of the gear 71 coincides with the center position 201 of the gear device 72 on the surface parallel to the XY plane. In this state, the gear 71 is positioned above the upper surface (or the upper surfaces of the gears 91 to 94) of the stand 81 by a predetermined distance in the direction of the Z axis. The predetermined distance may be arbitrary and may be 50 [mm] or approximately 50 [mm], for example.

Step S2

The control device 12 controls the robot 11 by the robot control unit 133 to move (lower) the gear 71 held by the end effector E1 of the robot 11 downward.

Step S3

The control device 12 determines whether or not the gear 71 is in contact with the gear device 72 with a predetermined force by the determination unit 132.

As a result of this determination, in a case where the determination unit 132 determines that the gear 71 is in contact with the gear device 72 with the predetermined force (Step S3: YES), the control device 12 controls the robot 11 by the robot control unit 133 to stop the gear 71 held by the end effector E1 of the robot 11. Thereafter, the processing proceeds to processing of Step S4.

Meanwhile, as a result of this determination, in a case where the determination unit 132 determines that the gear is not in contact with the gear device 72 with the predetermined force (Step S3: NO), the control device 12 continues the processing of Step S2.

Here, the determination unit 132 determines whether or not the gear 71 is in contact with the gear device 72 with the predetermined force based on the information of the detection result of the force detection portion 32 acquired by the information acquisition unit 131. The predetermined force may be an arbitrary force and may be 10 [N] or approximately 10 [N] in the Z axis direction, for example. In this case, for example, if a direction from a positive side of the Z axis to the negative side is set to a positive direction of the force, the predetermined force is +10 [N] or approximately +10 [N], and the target value (target force) of the detection result of the force detection portion 32 is −10 [N] or approximately −10 [N].

In the present embodiment, in the processing of Steps S2 and S3, the control device 12 validates only a force control related to a force (Fz) in the Z axis direction in the processing of the force control using the information of the detection result of the force detection portion 32.

Figure 5:
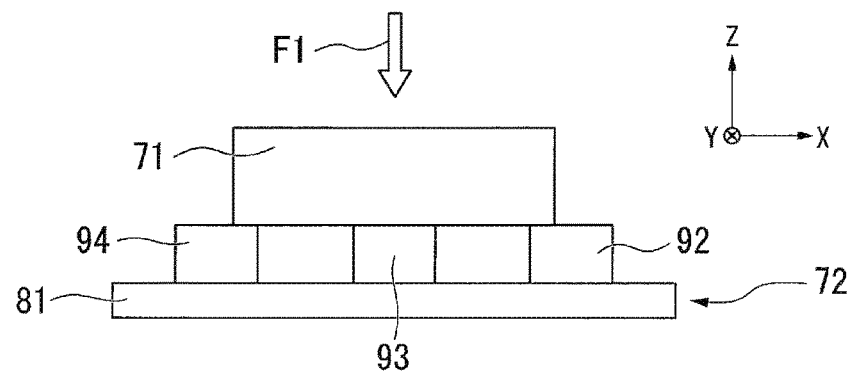
FIG. 5 is a view showing an example of the operation of combining the plurality of gears by the robot according to the embodiment (first embodiment) of the invention.

FIG. 5 shows a state in which a force F1 in the direction from the positive side of the Z axis to the negative side thereof is applied to the gear 71 and the gear 71 and the four gears 91 to 94 are in contact with each other.

Step S4

The control device 12 controls the robot 11 by the robot control unit 133 to rotate the gear 71 while applying a downward force to the gear 71 held by the end effector E1 of the robot 11. A direction of this rotation is a direction of a rotation around a central axis 301 (refer to FIG. 6, which coincides with the central axis of the gear device 72 in the present example), which is the central axis passing through the center position of the circular shape of the gear 71 and being parallel to the Z axis. The central axis 301 is an example of the first rotation axis.

Here, for example, the rotation of the gear 71 may be a rotation around an axis passing through the TCP of the robot 11.

The downward force may be an arbitrary force, and for example, similarly to the case of the processing of Step S3, may be 10 [N] or approximately 10 [N] in the Z axis direction.

Step S5

The control device 12 determines whether or not the gear 71 is lowered by the predetermined distance after the gear 71 rotates as compared to a state before the gear 71 rotates, by the determination unit 132.

As a result of this determination, in a case where the determination unit 132 determines that the gear 71 is lowered by the predetermined distance (Step S5: YES), the control device 12 stops the rotation of the gear 71. Thereafter, the processing proceeds to processing of Step S6.

Meanwhile, as a result of this determination, in a case where the determination unit 132 determines that the gear 71 is not lowered by the predetermined distance (Step S5: NO), the control device 12 continues the processing of Step S4.

Here, the predetermined distance may be an arbitrary distance and may be 10 [mm] or approximately 10 [mm], for example. In the present embodiment, compared to the state before the gear 71 rotates, in a case where the gear 71 is lowered by a predetermined distance after the gear 71 rotates, it is regarded that the gear 71 and all the four gears 91 to 94 engage with each other.

In the present embodiment, in the processing of Steps S4 and S5, the control device 12 validates a force control related to the force (Fx) in the X axis direction, a force (Fy) in the Y axis direction, a force (Fz) in the Z axis direction, a rotational moment (Tx) around the X axis, and a rotational moment (Ty) around the Y axis in the processing of the force control using the information of the detection result of the force detection portion 32. As another configuration example, the control device 12 may validate the force control related to a rotational moment (Tz) around the Z axis.

In this way, in the present embodiment, when the control device 12 matches the phases of the gear 71 and the gear device 72 with each other by the robot 11, the control device 12 performs the phase matching while causing the robot 11 to perform a copying operation in a predetermined torque direction (in the present embodiment, Tx and Ty). Accordingly, in a state where predetermined torque directions (in the present embodiment, Tx and Ty) are free, the control device 12 rotates the gear 71 in a predetermined torque direction (Tz in the present embodiment) while pressing the gear 71 to the gear device 72 in the Z axis direction by the robot 11.

In the present embodiment, in the processing of Steps S4 and S5, the copying operation using the force control is performed.

In the present embodiment, in the processing of Steps S4 and S5, a target value (a target force) is set such that forces other than the force (Fz) in the Z axis direction are set to 0 [N].

Figure 6:
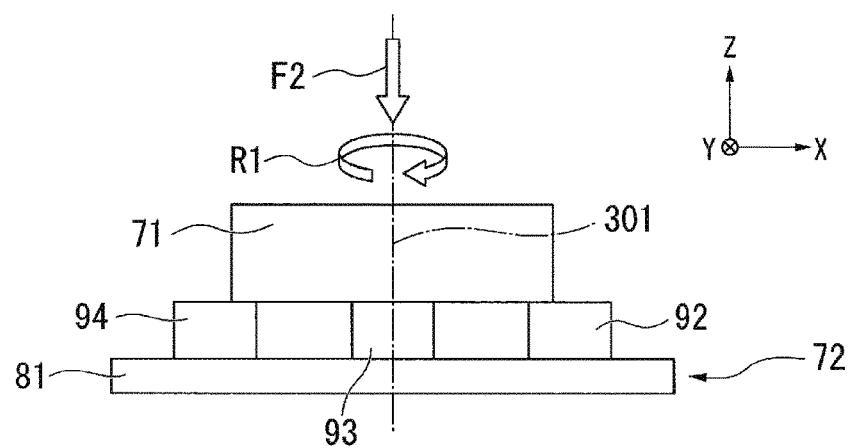
FIG. 6 is a view showing an example of the operation of combining the plurality of gears by the robot according to the embodiment (first embodiment) of the invention.

FIG. 6 shows a state in which the force F2 in the direction from the positive side of the Z axis to the negative side thereof is applied to the gear 71 and a rotation force R1 (moment force) around the central axis 301 of the gear 71 is applied to the gear 71.

Step S6

The control device 12 controls the robot 11 by the robot control unit 133 to change a posture of the gear 71 held by the end effector E1 of the robot 11. As the change in this posture, an aspect is used in which the posture of the gear 71 is changed such that the circular surface of the gear 71 is parallel to the XY plane. That is, as the change in this posture, an aspect in which the posture of the gear 71 is returned to the original state is used.

In this case, for example, a copying control may be performed by the force control or a position control may be performed. In general, the processing of the position control is faster than the processing of the force control until the control is completed.

Step S7

The control device 12 determines whether or not the posture of the gear 71 reaches a predetermined posture by the determination unit 132. As the predetermined posture, a posture is used in which the circular surface of the gear 71 is parallel to the XY plane.

As a result of this determination, in a case where the determination unit 132 determines that the posture of the gear 71 reaches the predetermined posture (Step S7: YES), the control device 12 stops the operation of changing the posture of the gear 71. Thereafter, the processing proceeds to processing of Step S8.

Meanwhile, as a result of this determination, in a case where the determination unit 132 determines that the posture of the gear 71 does not reach the predetermined posture (Step S7: NO), the control device 12 continues the processing of Step S6.

Figure 7:
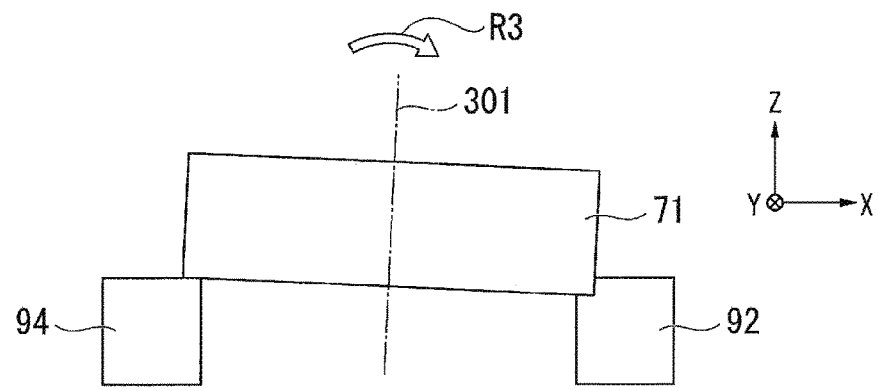
FIG. 7 is a view showing an example of the operation of combining the plurality of gears by the robot according to the embodiment (first embodiment) of the invention.
Figure 8:
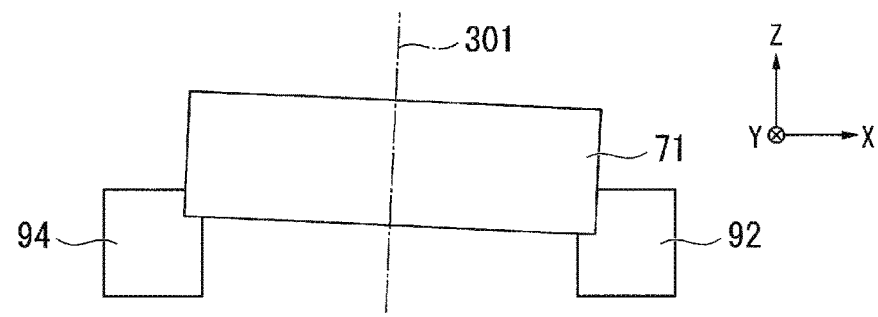
FIG. 8 is a view showing an example of the operation of combining the plurality of gears by the robot according to the embodiment (first embodiment) of the invention.
Figure 9:
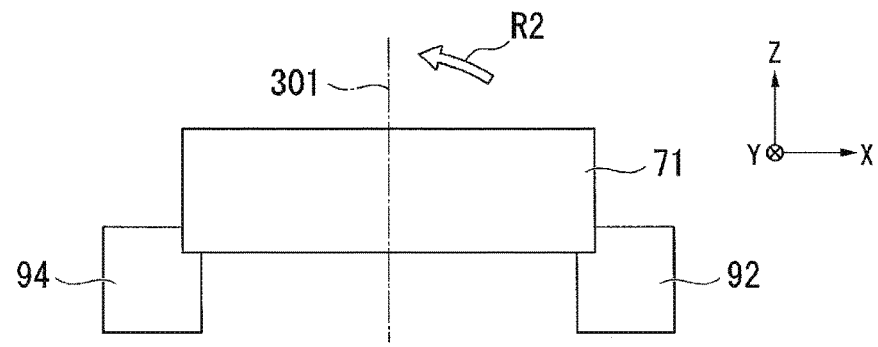
FIG. 9 is a view showing an example of the operation of combining the plurality of gears by the robot according to the embodiment (first embodiment) of the invention.

Here, a principle of matching the phases of the gear 71 and the four gears 91 to 94 with each other will be described with reference to FIGS. 7 to 9. In FIGS. 7 to 9, for easy understanding of the drawings, only two gears 92 and 94 among the four gears 91 to 94 are shown.

FIG. 7 shows an example of a state when the gear 71 and the gear device 72 are in contact with each other. The control device 12 rotates the gear 71 shown in FIG. 6 around the central axis 301 while applying a force to the gear 71 in the lowering direction, and thus, applies a rotation force R3 (moment force) around a central axis to the gear 71. In the example of FIG. 7, the control device 12 applies the rotation force R3 (moment force) around a central axis parallel to the Y axis to the gear 71. As a result, as shown in FIG. 7, the teeth of the gear 71 shown in FIG. 6 engage with the teeth of the gear 92. That is, the gear 71 is assembled to the gear 92. In the example of FIG. 7, the teeth of the gear 71 do not engage with the teeth of each of the gear 91, the gear 93, and the gear 94, and thus, the circular surface (central axis 301) of the gear 71 is slightly inclined. The central axis is an example of the second rotation axis.

FIG. 8 shows a state in which when the gear 71 is rotated, the gear 71 and the gear 94 engage with each other. In this state, the gear 71 engages with the two gears 92 and 94.

Similarly, if the gear 71 is rotated, the gear 71 engages with all of the four gears 91 to 94. Accordingly, the gear 71 and the four gears 91 to 94 are assembled and fitted to each other.

The order in which each of the four gears 91 to 94 engages with the gear 71 may depend on a situation at the time of the operation and may be arbitrary.

Here, if the phases of the four gears 91 to 94 are not matched with the phase of the gear 71, the gear 71 and the four gears 91 to 94 are not fitted to each other. Accordingly, in the present embodiment, the robot 11 not only simply presses the gear 71 and the four gears 91 to 94 but also rotates the gear 71.

FIG. 9 shows an example of the state when the rotation force R2 (moment force) for causing the direction of the central axis 301 of the gear 71 to be parallel to the direction of the Z axis is applied to the gear 71 and the posture of the gear 71 is changed. That is, the control device 12 rotates the gear 71 shown in FIG. 7 around the central axis 301 while applying a force to the gear 71 in the lowering direction, and thus, a rotation force R2 (moment force) around a central axis is applied to the gear 71. In the example of FIG. 9, the control device 12 applies the rotation force R2 (moment force) around the central axis parallel to the Y axis to the gear 71. As a result, as shown in FIG. 8, the teeth of the gear 71 shown in FIG. 7 engage with the teeth of the gear 94. In this case, the teeth of the gear 71 engage with the teeth of each of the gears 91 and 93. That is, the gear 71 is assembled to each of the gears 91, 93, and 94. Accordingly, in the example of FIG. 9, the teeth of the gear 71 engage with the teeth of each of the gears 91, 92, 93, and 94, and the circular surface (central axis 301) of the gear 71 is parallel to the XY plane. The central axis is an example of the third rotation axis.

Step S8

The control device 12 controls the robot 11 by the robot control unit 133 to move (lower) the gear 71 held by the end effector E1 of the robot 11 downward.

In this case, for example, the copying control may be performed by the force control, or the position control may be performed.

Step S9

The control device 12 determines whether or not the gear 71 reaches a predetermined state by the determination unit 132. For example, the predetermined state may be a state where the gear 71 is in contact with the gear device 72 with a predetermined force, may be a state where the gear 71 and all of the four gears 91 to 94 are in contact with each other, or may be other states. The predetermined force may be arbitrary and may be 10 [N] or approximately 10 [N] in the Z axis direction, for example. For example, in this case, if a direction from a positive side of the Z axis to the negative side is set to a positive direction of the force, the predetermined force is +10 [N] or approximately +10 [N], and the target value (target force) of the detection result of the force detection portion 32 is −10 [N] or approximately −10 [N].

In the present embodiment, when the control device 12 matches the phases of the gear 71 and the gear device 72 with each other by the robot 11, for example, the control device 12 performs the force control in the X axis direction, the Y axis direction, and the Z axis direction. For example, as the target force of the force control, 0 [N], 0 [N], and −10 [N] are used in the X axis direction, the Y axis direction, and the Z axis direction, respectively.

As a result of this determination, in a case where the determination unit 132 determines that the gear 71 reaches the predetermined state (Step S9: YES), the control device 12 stops the gear 71. Thereafter, the processing proceeds to processing of Step S10.

Meanwhile, as a result of this determination, in a case where the determination unit 132 determines that the gear 71 does not reach the predetermined state (Step S9: NO), the control device 12 continues the processing of Step S8.

Figure 10:
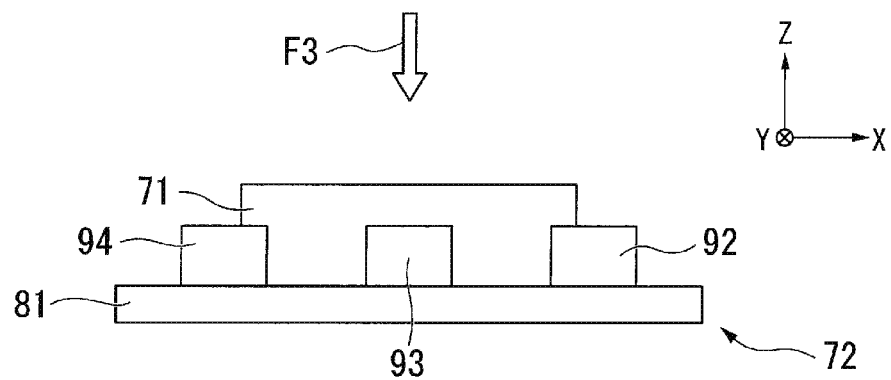
FIG. 10 is a view showing an example of the operation of combining the plurality of gears by the robot according to the embodiment (first embodiment) of the invention.

FIG. 10 shows a state in which a force F3 in the direction from the positive side of the Z axis to the negative side thereof is applied to the gear 71 and the gear 71 and the four gears 91 to 94 are in contact with each other. The example of FIG. 10 shows a state where the gear 71 is lowered to the position at which the gear 71 is in contact with the stand 81.

As another example, the predetermined state of the gear 71 may be a state where the lower surface of the gear 71 comes into contact with a surface (for example, a virtual surface) above the stand 81 (for example, slightly above the stand 81).

Step S10

The control device 12 controls the robot 11 by the robot control unit 133 to move (lift) the gear 71 held by the end effector E1 of the robot 11 upward.

Step S11

The control device 12 determines whether or not the gear 71 is lifted by a predetermined distance, by the determination unit 132. The predetermined distance may be arbitrary and may be 2 to 5 [mm] or approximately 2 to 5 [mm].

As a result of this determination result, in a case where the determination unit 132 determines that the gear 71 is lifted by a predetermined distance (Step S11: YES), the control device 12 stops the operation of the gear 71. Thereafter, the processing proceeds to processing of Step S12.

Meanwhile, as a result of this determination result, in a case where the determination unit 132 determines that the gear 71 is not lifted by a predetermined distance (Step S11: NO), the control device 12 continues the processing of Step S10.

Figure 11:
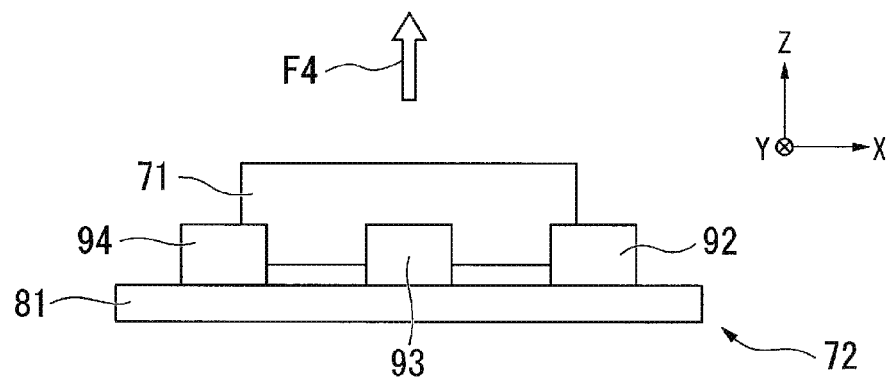
FIG. 11 is a view showing an example of the operation of combining the plurality of gears by the robot according to the embodiment (first embodiment) of the invention.

FIG. 11 shows a state where a force F4 in a direction from the negative side of the Z axis to the positive side thereof is applied to the gear 71. The example of FIG. 11 shows a state where the gear 71 is slightly lifted from the state where the gear 71 is in contact with the stand 81.

Step S12

The control device 12 controls the robot 11 by the robot control unit 133 to perform processing of rotation check.

For example, in the processing of the rotation check, the control device 12 controls the robot 11 by the robot control unit 133 to rotate the gear 71 held by the end effector E1 of the robot 11. A direction of this rotation is the direction of the rotation around the central axis (in the present example, which coincides with the central axis of the gear device 72) which passes through the center position of the circular shape of the gear 71 and is parallel to the Z axis. The control device 12 acquires the detection result of the force detection portion 32. A measurement result of the rotation torque is ascertained by the information of the detection result, and thus, it is possible to check presence or absence of missing parts or an assembly failure of the gear 71.

For example, in the processing of the rotation check, one or both of two rotation directions may be performed. A speed of the rotation may be an arbitrary speed and may be a predetermined constant speed, for example.

Step S13

If the processing of the rotation check is completed, the control device 12 controls the robot 11 by the robot control unit 133 to dispose the gear 71 held by the end effector E1 of the robot 11 at a predetermined position (end position). In this case, the control device 12 controls the robot 11 by the robot control unit 133 to lift the gear 71 held by the end effector E1 of the robot 11.

Here, for example, the start position and the end position of the gear 71 may be the same as each other or may be different from each other.

Here, in the present embodiment, the case of performing the operation using the gear 71 and the gear device by the robot 11 is described. However, as another configuration example, a jig capable of performing the similar operation may be used instead of one or both of the gear 71 and the gear device 72.

As another configuration example, a jig having an arbitrary function may be used in addition to the gear 71 and the gear device 72, and for example, a jig or the like having a function for checking the rotation may be used.

For example, the control device 12 may store the information of the detection result of the force detection portion 32 acquired by the information acquisition unit 131 in a portion or all of the series of processing flows shown in FIG. 12, in the storage unit 113. Accordingly, the control device 12 can store the information in time series. As another configuration example, a torque sensor which detects the torque of each of the six axes included in the manipulator M1 of the robot 11 is provided, and the control device 12 may store the information of the torque of each axis. For example, this storage may be performed at a predetermined period.

In the above-described example, as shown in FIG. 5, the case is described in which the control device 12 lowers the gear 71 in the lowering direction until the gear 71 comes into contact with all the gears 91, 92, 93, and 94. However, this is only an example. That is, the control device 12 may lower the gear 71 in the lowering direction until the gear 71 comes into contact with some of the gears 91, 92, 93, and 94, and thereafter, may rotate the gear 71 around the central axis 301 while applying a force in the lowering direction. In this case, in the state shown in FIG. 7, the gear engaging with the gear 71 may be a gear which is included in some of the gears 91 to 94 or may be a gear which is not included in some of the gears 91 to 94. That is, in a case where the gear included in some of the gears 91 to 94 is the gear 92 (in this case, the gear 92 is an example of the second object), in the state shown in FIG. 7, the gear engaging with the gear 71 may be the gear 92 or may be any one gear (this gear is an example of the third object in this case) of the gears 91, 93, and 94. In other words, the teeth which initially mesh with the teeth of the gear 71 by the control device 12 may be the teeth of the gear which is the same as the gear which initially comes into contact with the gear 71 or may be the teeth of the gear which is the same as the gear which does not come into contact with the gear 71 initially.

Overview of First Embodiment

As described above, in the control device 12, the robot 11, and the robot system 1 according to the present embodiment, the control device 12 controls the robot 11 to match the phases of the four bodies (gears 91, 92, 93, and 94) with the phase of the one body (that is, gear 72). Accordingly, the control device 12 can effectively perform the operation of assembling the four bodies to the one body.

However, this is only one example, and the control device 12 may control the robot 11 to match the phases of two or more bodies with the phase of one body. For example, the control device 12 controls the robot 11 and can effectively perform an operation of matching phases of two bodies with a phase of one body and assembling the two bodies to the one body. For example, the control device 12 controls the robot 11 and can effectively perform an operation of matching phases of three bodies with a phase of one body and assembling the three bodies to the one body. For example, the control device 12 can effectively perform an operation of matching phases of five or more bodies with a phase of one body and assembling the five or more bodies to the one body.

For example, in the control device 12, the robot 11, and the robot system 1 according to the present embodiment, even when misalignment occurs in an assembled body (even when misalignment occurs in one or more of the gear 71 or the gears 91 to 94), it is possible to perform the assembly (for example, fitting) of the body with high accuracy.

Here, misalignment may occur in the assembled bodies in a case where there is some margin (gap) between the assembled bodies (in the example of FIG. 1, between the gear 71 and the other gears 91 to 94). However, in the control device 12, the robot 11, and the robot system 1 according to the present embodiment, it is possible to realize assembling of bodies by compensating for the misalignment.

As a configuration example, there is provided a control device (in the present embodiment, the control device 12) which controls a robot (in the present embodiment, the robot 11) including a movable portion (the manipulator M1 in the present embodiment), the control device including: a control unit (in the present embodiment, the control unit 114) which controls the movable portion, in which in a case where the control unit assembles a first object (in the present embodiment, the gear 71) held by a holding portion (in the present embodiment, the end effector E1) provided in the movable portion to a second object and a third object (in the present embodiment, any two of the four gears 91 to 94), the control unit causes the first object to come into contact with at least one of the second object and the third object, rotates the first object around a second rotation axis (in the present embodiment, the predetermined rotation axis included in the surface parallel to the XY plane) intersecting a first rotation axis (in the present embodiment, the axis parallel to the Z axis) while rotating the first object around the first rotation axis to assemble the second object and the first object to each other, and thereafter, rotates the first object around a third rotation axis (in the present embodiment, the predetermined rotation axis included in the surface parallel to the XY plane) intersecting the first rotation axis to assemble the third object and the first object to each other.

Here, in the present embodiment, as the intersection between the second rotation axis and the first rotation axis, the orthogonality is used, and similarly, as the intersection between the third rotation axis and the first rotation axis, the orthogonality is used. That is, in the present embodiment, the second rotation axis and the first rotation axis are orthogonal to each other, and the third rotation axis and the first rotation axis are orthogonal to each other.

As another configuration example, the second rotation axis and the first rotation axis may intersect to each other except being orthogonal to each other, and the third rotation axis and the first rotation axis may be orthogonal to each other. As another configuration example, the second rotation axis and the first rotation axis may be orthogonal to each other, and the third rotation axis and the first rotation axis may intersect each other except being orthogonal to each other. As another configuration example, the second rotation axis and the first rotation axis may intersect each other except being orthogonal to each other, and the third rotation axis and the first rotation axis may intersect each other except being orthogonal to each other.

For example, the second rotation axis and the third rotation axis may be the same as each other or may be different from each other. For example, the second rotation axis is determined by the deposition of the second object and the third rotation axis is determined by the deposition of the third object.

As an example, in the example of FIG. 1, in a case where the object (second object or the third object) is the gear 91 or the gear 93, for example, the rotation axis (the second rotation axis or the third rotation axis) becomes an axis parallel to the X axis or an axis which is approximately parallel to the X axis.

In the example of FIG. 1, in a case where the object (second object or the third object) is the gear 92 or the gear 94, the rotation axis (the second rotation axis or the third rotation axis) becomes an axis parallel to the Y axis or an axis which is approximately parallel to the Y axis.

As a configuration example, a force detection portion (in the present embodiment, the force detection port ion 32) which detects a force is provided in the movable portion, and the control unit assembles the first object to the second object and the third object by a force control based on an output from the force detection portion.

As a configuration example, the control unit performs the force control in a state where a target force in an axial direction (in the present embodiment, the direction parallel to the Z axis) of the first rotation axis is set to a value (in the present embodiment, for example, 10 [N]) other than 0 while rotating the first object around the first rotation axis. That is, the control unit performs the force control in a state where the target force in the axial direction (in the present embodiment, the direction parallel to the Z axis) of the first rotation axis is set to a value (in the present embodiment, for example, 10 [N]) having an absolute value which is larger than 0 while rotating the first object around the first rotation axis.

As a configuration example, the control unit performs the force control in a state where a target force in a rotation around the second rotation axis and a target force in a rotation around the third rotation axis are set to be smaller than a target force in an axial direction of the first rotation axis.

As a configuration example, the control unit performs the force control in a state where the target force in the rotation around the second rotation axis and the target force in the rotation around the third rotation axis are set to 0.

As a configuration example, the force detection portion detects a force by a piezoelectric element.

As a configuration example, the piezoelectric element is quartz.

As a configuration example, the first object, the second object, and the third object are gears.

As a configuration example, the second rotation axis is orthogonal to the first rotation axis.

As a configuration example, the third rotation axis is orthogonal to the first rotation axis.

As a configuration example, there is provided a robot (in the present embodiment, the robot 11) controlled by the above-described control device.

As a configuration example, there is provided a robot system (in the present embodiment, the robot system 1) including: the above-described control device; and a robot which is controlled by the control device.

Here, in the present embodiment, the case where the gear 71 and the gear device 72 (the four gears 91 to 94) are assembled to each other is described. However, as another configuration example, a configuration in which an arbitrary body and an arbitrary body are assembled to each other may be used.

In the present embodiment, the case where the one body (in the present embodiment, the gear 71) and the four bodies (in the present embodiment, the gears 91 to 94) are assembled to each other is described. However, as another configuration example, a configuration in which one body and two bodies are assembled to each other may be used, a configuration in which one body and three bodies are assembled to each other may be used, or a configuration in which one body and five or more bodies are assembled to each other may be used.

In the present embodiment, as the robot, the vertical articulated robot is used. However, as another configuration example, an arbitrary robot may be used. For example, a robot (a two-arm robot) having two arms may be used, or a robot having three or more arms may be used. For example, as the robot, a scalar robot may be used. For example, in each robot, a portion (a portion corresponding to the arm) moving the holding portion may be used as the movable portion.

Second Embodiment

In the present embodiment, matters different from the first embodiment will be described in detail, and descriptions of the same matters as those of the first embodiment will be simplified or omitted.

In the present embodiment, for convenience of explanation, the same reference numerals are used for the same configurations or processing as those shown in FIGS. 1 to 12 used in the descriptions of the first embodiment.

Schematically, a configuration of a robot system in the present embodiment is similar to the configuration of the robot system 1 shown in FIGS. 1 and 2, and there are main differences in processing of Steps S1 to S7 shown in FIG. 12. In the present embodiment, as an example of another processing which is replaced by the processing of Step S1 to Step S7 shown in FIG. 12, it will be referred to as "Modification Example of Step S1" to "Modification Example of Step S7". The processing of Step S8 to Step S13 shown in FIG. 12 is similar to each other.

An operation of combining a plurality of gears 411 and 91 to 94 by the robot 11 will be described with reference to FIGS. 13 to 15 and 12.

Figure 13:
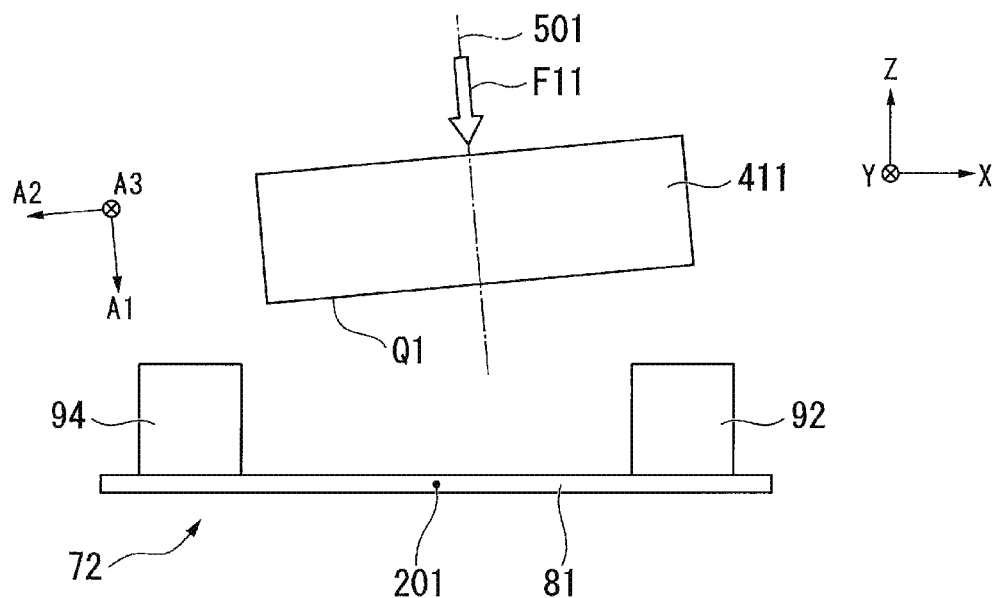
FIG. 13 is a view showing an example of an operation of combining a plurality of gears by a robot according to an embodiment (second embodiment) of the invention.
Figure 14:
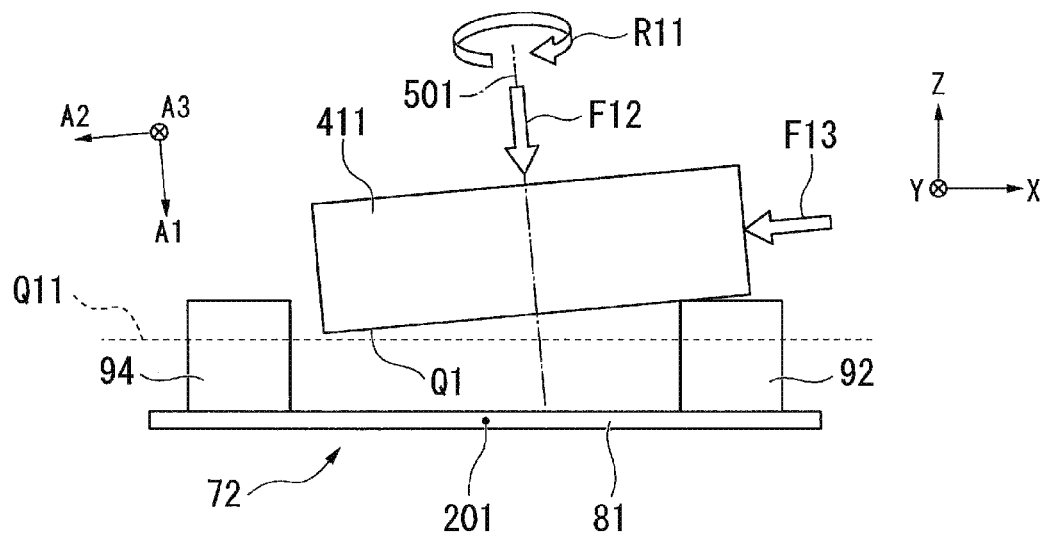
FIG. 14 is a view showing an example of the operation of combining the plurality of gears by the robot according to the embodiment (second embodiment) of the invention.
Figure 15:
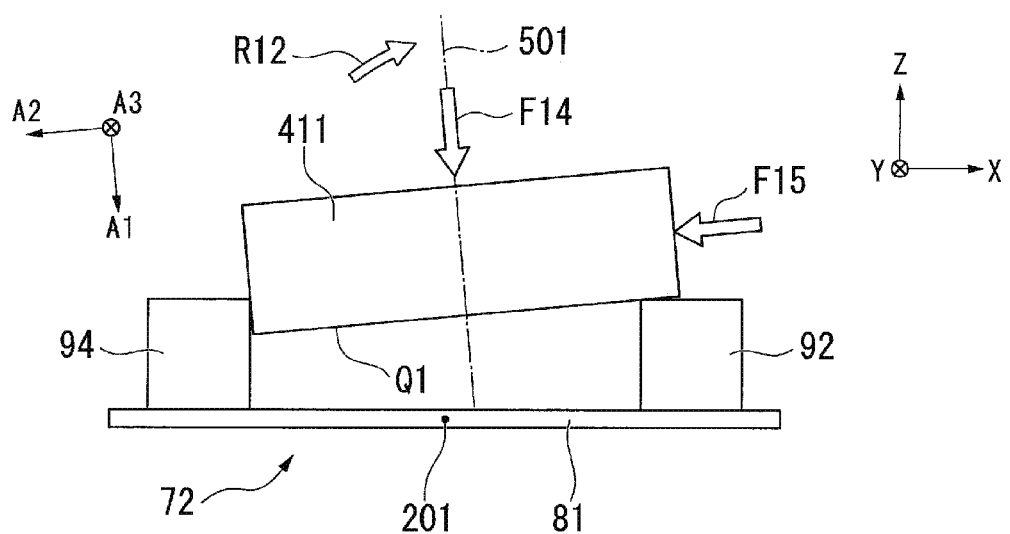
FIG. 15 is a view showing an example of the operation of combining the plurality of gears by the robot according to the embodiment (second embodiment) of the invention.

In FIGS. 13 to 15, the XYZ coordinate axes similar to those of FIG. 1 are shown.

In FIGS. 13 to 15, a direction A1, a direction A2, and a direction A3 are shown as three different directions orthogonal to each other. The three directions (direction A1, direction A2, and direction A3) indicate three axial directions in three-dimensional orthogonal coordinates fixed to the gear 411. In the present embodiment, an origin of the three-dimensional orthogonal coordinates is positioned at the position of the center of gravity of the gear 411.

In the example of FIGS. 13 to 15, in a surface Q1 facing the upper surface (or the upper surfaces of the gears 91 to 94) of the stand 81 among the plurality of surfaces included in the gear 411, the direction A1 corresponds to a direction approaching the gear device 72 from the gear 411 in a direction perpendicular to the surface Q1, and the direction A2 is parallel to the surface Q1 and corresponds to the direction from the point farthest from the gear device 72 to the nearest point to the gear device 72 on the surface Q1.

In the example of FIGS. 13 to 15, the direction A3 corresponds to the direction of the Y axis, and the directions A1 and A2 respectively correspond to the Z axis and the X axis in a case where the XYZ coordinate system is rotated around the Y axis.

The three directions (direction A1, direction A2, direction A3) are fixed when viewed from the gear 411, and are changed in the same way according to a change in the posture of the gear 411.

In the present embodiment, for convenience of explanation, a rotational moment (torque) around direction A1 is referred to as torque A1, a rotational moment (torque) around the direction A2 is referred to as torque A2, and a rotational moment (torque) around the direction A3 is referred to torque A3.

FIGS. 13 to 15 are views showing an example of an operation of combining the plurality of gears 411 and 91 to 94 by the robot 11 according to the embodiment of the invention.

Here, in FIGS. 13 to 15, for easy understanding of the drawings, the robot 11 (particularly, the end effector E1) holding the gear 411 and the gears 91 and 93 of the gear device 72 are not shown.

For example, the gear 411 shown in FIGS. 13 to 15 is similar to the gear 71 shown in FIGS. 1 and 3 to 11. However, in the present embodiment, for convenience of explanation, the reference numeral is changed.

Modification Example of Step S1

The control device 12 controls the robot 11 by the robot control unit 133 to dispose the gear 411 held by the end effector E1 of the robot 11 at a predetermined position (start position).

Here, for example, the control device 12 may ascertain the position of the gear device 72 in advance by teaching of a user or the like, or may detect and ascertain the position of the gear device 72 based on the information of the image captured by the imaging device 21.

FIG. 13 shows a state where the gear 411 is disposed at the start position.

In this state, the surface Q1 facing the upper surface (or the upper surfaces of the gears 91 to 94) of the stand 81 among the plurality of surfaces included in the gear 411 is inclined with respect to the XY plane (that is, is not parallel to the XY plane). In the example of FIG. 13, when viewed in a direction from the negative side of the Y axis to the positive side thereof, in a distance in the Z direction between the surface Q1 of the gear 411 and the upper surface (or the upper surfaces of the gears 91 to 94) of the stand 81, the distance positioned in the positive side of the X axis is larger than the distance positioned in the negative side of the X axis. A degree of this inclination may be arbitrary. In the example of FIG. 13, this inclination corresponds to an inclination between the direction from the positive side of the Z axis to the negative side thereof and the direction A1 (the direction from the negative side to the positive side).

In this state, the gear 411 is positioned above the upper surface (or the upper surfaces of the gears 91 to 94) of the stand 81 by a predetermined distance (by distances different from each other according to the positions of the X axis due to the inclination) in the direction of the Z axis. The predetermined distance may be arbitrary and may be 50 [mm] or approximately 50 [mm] at the center position in the X axis direction, for example.

In this state, for example, the center position (the center position on the surface Q1) of the circular shape of the gear 411 coincides with the center position 201 related to the gear device 72 or is positioned in the vicinity of the center position 201 on the surface parallel to the XY plane.

Modification Example of Step S2

The control device 12 controls the robot 11 by the robot control unit 133 to move (lower) the gear 411 held by the end effector E1 of the robot 11 in a direction (direction A1) perpendicular to the surface Q1 and in a direction (obliquely downward) in which the gear 411 approaches the gear device 72.

In FIG. 13, a central axis 501 perpendicular to the surface Q1 of the gear 411 is shown, and a force F11 which is applied to the gear 411 and is in a direction (direction A1) along the central axis 501 is shown. In the present embodiment, the force F11 is applied so as to move the entire gear 411 in the direction of the force F11, and is regarded as substantially applied to the center of gravity of the gear 411, for example.

In the present embodiment, the control device 12 controls the robot 11 by the robot control unit 133 to move the gear 411 in a state where the inclination of the gear 411 with respect to the gear device 72 is maintained.

As another example, the control device 12 may control the robot 11 by the robot control unit 133 to move (lower) the gear 411 held by the end effector E1 of the robot 11 in another direction or to move (lower) the gear 411 downward (the negative direction in the Z axis), for example.

Here, in the present embodiment, when the control device 12 controls the robot 11 by the robot control unit 133 to move the gear 411 such that the gear 411 and the gear device 72 come into contact with each other, in a case viewed in the direction from the negative side of the Y axis to the positive side thereof, the control device 12 moves the gear 411 such that one side (in the example of FIG. 13, right side) of the surface Q1 of the gear 411 comes into contact with the gear device 72 (in the example of FIG. 13, the gear 92) while the other side (in the example of FIG. 13, left side) of the surface Q1 of the gear 411 does not come into contact with the gear device 72 (in the example of FIG. 13, the gear 94). That is, the control device 12 causes the tip of the other side (in the example of FIG. 13, left side) of the surface Q1 of the gear 411 to enter a portion among the four gears 91 to 94 included in the gear device 72.

Modification Example of Step S3

The control device 12 determines whether or not the gear 411 comes into contact with the gear device 72 with a predetermined force by the determination unit 132.

As a result of this determination, in a case where the determination unit 132 determines that the gear 411 is in contact with the gear device 72 with the predetermined force (Modification Example of Step S3: YES), the control device 12 controls the robot 11 by the robot control unit 133 to stop the gear 411 held by the end effector E1 of the robot 11. Thereafter, the processing proceeds to processing of Modification Example of Step S4.

Meanwhile, as a result of this determination, in a case where the determination unit 132 determines that the gear 411 is not in contact with the gear device 72 with the predetermined force (Modification Example of Step S3: NO), the control device 12 continues the processing of Modification Example of Step S2.

Here, the determination unit 132 determines whether or not the gear 411 is in contact with the gear device 72 with the predetermined force based on the information of the detection result of the force detection portion 32 acquired by the information acquisition unit 131. The predetermined force may be an arbitrary force and may be 10 [N] or approximately 10 [N] in the movement direction (in the example of FIG. 13, the direction of the force F11 in the direction A1) of the gear 411, for example. In this case, for example, if the movement direction of the gear 411 is set to a positive direction of the force, the predetermined force is +10 [N] or approximately +10 [N], and the target value (target force) of the detection result of the force detection portion 32 is −10 [N] or approximately −10 [N].

In the present embodiment, in the processing of Modification Examples of Steps S2 and S3, the control device 12 validates only a force control related to the force (in the example of FIG. 13, force F11) in the movement direction of the gear 411 in the processing of the force control using the information of the detection result of the force detection portion 32.

Modification Example of Step S4

The control device 12 controls the robot 11 by the robot control unit 133 to rotate the gear 411 with a rotation force R11 while applying a force F12 in the direction (direction A1) along the central axis 501 and a force F13 in the direction (direction A2) perpendicular to the central axis 501 to the gear 411 held by the end effector E1 of the robot 11. In the direction of this rotation is a direction of the rotation (the rotation in the direction A1) around the central axis 501 passing through the center position of the circular shape of the gear 411.

In the present embodiment, the force F13 is a force in a direction (direction A2) from a point where a distance from the gear device 72 is the maximum on the surface Q1 to a point where the distance from the gear device 72 is the minimum on the surface Q1.

Here, for example, the rotation of the gear 411 may be a rotation around an axis passing through the TCP of the robot 11.

The force F12 may be an arbitrary force, and for example, similarly to the case of the processing of Modification Example of Step S3, may be 10 [N] or approximately 10 [N].

FIG. 14 shows a state where the force F12 and the force F13 are applied to the gear 411 and the rotation force R11 (moment force) around the central axis 501 of the gear 411 is applied to the gear 411.

In FIG. 14, a surface (for example, a virtual surface Q11) below (for example, slightly below) the upper surfaces of the four gears 91 to 94 is shown. The surface Q11 is set to a position at which the gear 411 does not reach if the phases of all of the gears 411 and the four gears 91 to 94 do not match with each other. That is, when the phases of all of the gear 411 and the four gears 91 to 94 are matched with each other, the surface Q1 of the gear 411 reaches a position where the surface Q1 comes into contact with the surface Q11.

In the present embodiment, each of the force F12 and the force F13 is applied so as to move the entire gear 411 in the direction of the force (the direction of the force F12 or F13), and is regarded as substantially being applied to the center of gravity of the gear 411, for example.

Each of the force F12 and the force F13 may be an arbitrary force and may be 10 [N] or approximately 10 [N], for example.

Modification Example of Step S5

The control device 12 determines whether or not the gear 411 is lowered by the predetermined distance after the gear 411 rotates as compared to a state before the gear 411 rotates, by the determination unit 132.

As a result of this determination, in a case where the determination unit 132 determines that the gear 411 is lowered by the predetermined distance (Modification Example of Step S5: YES), the control device 12 stops the rotation of the gear 411. Thereafter, the processing proceeds to processing of Modification Example of Step S6.

Meanwhile, as a result of this determination, in a case where the determination unit 132 determines that the gear 411 is not lowered by the predetermined distance (Modification Example of Step S5: NO), the control device 12 continues the processing of Modification Example of Step S4.

Here, the predetermined distance may be an arbitrary distance and may be 10 [mm] or approximately 10 [mm], for example. For example, the predetermined distance may be distances (distances having a range) which are different from each other according to the positions in the direction of the X axis. In the present embodiment, compared to the state before the gear 411 rotates, in a case where the gear 411 is lowered by a predetermined distance after the gear 411 rotates, it is regarded that the gear 411 and at least one gear (in the present embodiment, at least one of the four gears 91 to 94) engage with each other.

In the present embodiment, in the processing of Modification Examples of Step S4 and S5, the control device 12 validates force controls related to the direction (direction A1) of the force F12, the direction (direction A2) of the force F13, the direction (direction A3) orthogonal to the forces F12 and F13, the rotational moment (torque A2) around the direction A2, and the rotational moment (torque A3) around the direction A3 in the processing of the force control using the information of the detection result of the force detection portion 32. For example, as the target force, −10 [N], −10 [N], 0 [N], 0 [N], and 0 [N] are respectively used for the direction A1, the direction A2, the direction A3, the torque A2, and the torque A3.

As another configuration example, the control device 12 may validate the force control related to the rotational moment (torque A1) in the direction A1.

In this way, in the present embodiment, when the control device 12 matches the phases of the gear 411 and the gear device 72 with each other by the robot 11, the control device 12 performs the phase matching while causing the robot 11 to perform a copying operation in a predetermined torque direction (in the present embodiment, torque A2 and torque A3). Accordingly, in a state where predetermined torque directions (in the present embodiment, torque A2 and torque A3) are free, the control device 12 rotates the gear 411 in a predetermined torque direction (torque A1 in the present embodiment) while pressing the gear 411 to the gear device 72 in the directions A1 and A2 by the robot 11.

In the present embodiment, in the processing of Modification Examples of Steps S4 and S5, the copying operation using the force control is performed.

In the present embodiment, in the processing of Modification Examples of Steps S4 and S5, a target value (a target force) is set such that forces other than the force F12 in the direction A1 and the force F13 in the direction A2 are set to 0 [N].

Modification Example of Step S6

The control device 12 controls the robot 11 by the robot control unit 133 to change a posture of the gear 411 held by the end effector E1 of the robot 11. As the change in this posture, an aspect is used in which the posture of the gear 411 is changed such that the circular surface (in the present embodiment, surface Q1) of the gear 411 is parallel to the XY plane. That is, as the change in this posture, an aspect in which the posture of the gear 411 is changed to the assembled state is used.

In the present embodiment, The control device 12 controls the robot 11 by the robot control unit 133 to rotate the gear 411 with a rotation force R12 while applying a force F14 in the direction (direction A1) along the central axis 501 and a force F15 in the direction (direction A2) perpendicular to the central axis 501 to the gear 411 held by the end effector E1 of the robot 11. The direction of this rotation is a direction of a rotation (the direction of the rotation is two ways, but is a direction of a rotation in which the direction of the straight line perpendicular to the surface Q1 coincides with the direction of the Z axis in the rotation of 90 degrees or less) in which the direction (the direction of the central axis 501) of a straight line perpendicular to the surface Q1 of the gear 411 coincides with the direction of the Z axis.

In the present embodiment, the force F15 has a direction from a point where the distance from the gear device 72 is the maximum on the surface Q1 to a point where the distance from the gear device 72 is the minimum on the surface Q1.

FIG. 15 shows a state where the force F14 and the force F15 are applied to the gear 411 and the predetermined rotation force R12 (moment force) is applied to the gear 411.

In the present embodiment, each of the force F14 and the force F15 is applied so as to move the entire gear 411 in the direction of the force (the direction of the force F14 or F15), and is regarded as substantially being applied to the center of gravity of the gear 411, for example.

Each of the force F14 and the force F15 may be an arbitrary force and may be 10 [N] or approximately 10 [N], for example.

In this case, as another configuration example, instead of the configuration of performing the copying control by the force control, a configuration of performing the position control may be used. In general, the processing of the position control is faster than the processing of the force control until the control is completed.

Modification Example of Step S7

The control device 12 determines whether or not the posture of the gear 411 reaches a predetermined posture by the determination unit 132. As the predetermined posture, a posture is used in which the circular surface (in the present embodiment, the surface Q1) of the gear 411 is parallel to the XY plane.

As a result of this determination, in a case where the determination unit 132 determines that the posture of the gear 411 reaches the predetermined posture (Modification Example of Step S7: YES), the control device 12 stops the operation of changing the posture of the gear 411. Thereafter, the processing proceeds to the next processing (here, the processing of Step S8 shown in FIG. 12).

Meanwhile, as a result of this determination, in a case where the determination unit 132 determines that the posture of the gear 411 does not reach the predetermined posture (Modification Example of Step S7: NO), the control device 12 continues the processing of Modification Example of Step S6.

In the present embodiment, in the processing of Modification Examples of Step S6 and Step S7, the control device 12 performs the processing of the force control similarly to the case of the processing of Modification Examples of Step S4 and Step S5.

As another example, in the processing of Modification Examples of Step S6 and Step S7, the target value (target force) of the force control in the direction A2 may be set to 0. In this case, for example, as the target force, −10 [N], 0 [N], 0 [N], 0 [N], and 0 [N] are respectively used for the direction A1, the direction A2, the direction A3, the torque A2, and the torque A3.

As another configuration example, the control device 12 may validate the force control related to the rotational moment (torque A1) in the direction A1.

Overview of Second Embodiment

As described above, in the control device 12, the robot 11, and the robot system 1 according to the present embodiment, the control device 12 controls the robot 11, and thus, it is possible to effectively perform the operation of matching the phases of the two bodies with the phase of the one body to assemble the two bodies to the one body.

For example, as shown in FIG. 1, the control device 12, the robot 11, and the robot system 1 according to the present embodiment may be applied to the operation of matching the phases of three or more bodies with the phase of one body to assemble the three or more bodies to the one body, and thus, it is possible to effectively perform the operation.

As shown in the example of FIG. 13, in the control device 12, the robot 11, and the robot system 1 according to the present embodiment, the gear 411 comes into contact with the gear device 72 in the posture where the gear 411 is inclined to the gear device 72. For example, in a case where the gear device 72 is lowered in a state where the gear 411 is not inclined to the gear device 72, a situation in which the gear 411 rides on the gear device 72 and is not fitted to the gear device 72 may occur. However, in the present embodiment, it is possible to suppress (ideally, prevent) occurrence of the situation.

In the control device 12, the robot 11, and the robot system 1 according to the present embodiment, as shown in FIG. 14, after the gear 411 comes into contact with the gear device 72, the gear 411 is rotated while the force F12 is applied to the gear 411 in the direction (direction A1) perpendicular to the inclined surface (surface Q1) to press the gear 411 and the force F13 is applied to the gear 411 in the direction (in the present embodiment, the direction A2 from the point farthest from the gear device 72 to the nearest point to the gear device 72) along the inclination to press the gear 411, and the phases of the gear 411 and the gears 91 to 94 are matched with each other. Accordingly, in the control device 12, the robot 11, and the robot system 1 according to the present embodiment, it is possible to fit the gear 411 and the gear device 72 (gears 91 to 94) to each other while pressing the gear 411 to the inner surface (for example, the side surfaces of at least one of the gears 91 to 94) of the gear device 72, and thus, it is possible to shorten a time required until the fitting (assembling) is completed. That is, it is possible to rapidly fit the gear 411 and the gear device 72 (gears 91 to 94) to each other.

In the control device 12, the robot 11, and the robot system 1 according to the present embodiment, as the example of FIG. 15, after the gear 411 is fitted to a portion of the gear device 72, the gear 411 moves (rotates) to the assembled posture while the force F14 is applied to the gear 411 in the direction (direction A1) perpendicular to the inclined surface (surface Q1) to press the gear 411 and the force F15 is applied to the gear 411 in the direction (in the present embodiment, the direction A2 from the point farthest from the gear device 72 to the nearest point to the gear device 72) along the inclination to press the gear 411. Accordingly, in the control device 12, the robot 11, and the robot system 1 according to the present embodiment, it is possible to perform fitting of other portions (the entire assembly between the gear 411 and the gear device 72) in a state where the fitting state of a portion is maintained such that the fitting state of a portion does not come off.

As a configuration example, the control unit performs the force control in a state where a target force in an axial direction (in the present embodiment, direction A2) of a fourth rotation axis intersecting the first rotation axis is set to a value other than 0 while rotating the first object around the first rotation axis (in the present embodiment, the axis parallel in the direction A1) (for example, the example of FIG. 14). That is, the control unit performs the force control in a state where a target force in the axial direction (in the present embodiment, direction A2) of the fourth rotation axis intersecting the first rotation axis is set to a value having an absolute value which is larger than 0 while rotating the first object around the first rotation axis (in the present embodiment, the axis parallel in the direction A1) (for example, the example of FIG. 14).

As a configuration example, the axial direction of the fourth rotation axis is a direction (in the example of FIG. 14, the direction approaching the gear 94) approaching the second object or the third object.

As a configuration example, when the control unit changes an axial direction of the first rotation axis (in the present embodiment, the axis parallel in the direction A1) to a direction (in the present embodiment, the direction parallel to the Z axis) after the assembling, the control unit performs the force control in a state where a target force in an axial direction (in the present embodiment, the direction A2) of a fifth rotation axis intersecting the first rotation axis is set to a value other than 0 (for example, the example of FIG. 15). That is, when the control unit changes the axial direction of the first rotation axis (in the present embodiment, the axis parallel in the direction A1) to the direction (in the present embodiment, the direction parallel to the Z axis) after the assembling, the control unit performs the force control in a state where the target force in the axial direction (in the present embodiment, the direction A2) of a fifth rotation axis intersecting the first rotation axis is set to a value having an absolute value which is larger than 0 (for example, the example of FIG. 15).

As a configuration example, when the control unit causes the first object to come into contact with at least one of the second object and the third object, the control unit causes the first object to come into contact with at least one of the second object and the third object in a posture in which the first object is inclined with respect to a posture after the first object is assembled (for example, the example of FIG. 13).

Overview of Embodiments

A program for realizing the function of an arbitrary configuration portion in the above-described device (for example, the control device 12 or the like) may be recorded (stored) in a computer-readable recording medium (storage medium) so as to be read and executed by a computer system. The "computer system" mentioned here includes hardware such as an operating system (OS) or peripheral equipment. The hardware includes, for example, a central processing unit (CPU) being one example of a processor. The "computer-readable recording medium" refers to a storage medium such as a flexible disk, a magneto-optical disk, a portable medium such as a Read Only Memory (ROM) or a Compact Disc (CD)-ROM, or a hard disk built in a computer system. The "computer-readable recording medium" refers to a volatile memory (RAM: Random Access Memory) inside a computer system serving as a server or a client in a case where a program is transmitted via a network such as the Internet or a communication line such as a telephone line and includes a storage medium holding the program for a certain period of time.

The program may be transmitted from a computer system in which the program is stored in a storage device or the like to another computer system via a transmission medium or by a transmission wave in a transmission medium. Here, the "transmission medium" for transmitting the program refers to a medium having a function of transmitting information such as a network (communication network) of the Internet or the like or a communication line (communication line) of a telephone line or the like.

The program may realize a portion of the above-described functions. The program may be a so-called difference file (difference program) which can be realized by combining the above-described function with a program recorded in the computer system in advance.

Hereinbefore, although the embodiments of the invention are described in detail with reference to the drawings. However, the specific configurations are not limited to the embodiments, and designs and the like within the scope which does not depart from the gist of the invention are included in the invention.

The entire disclosures of Japanese Patent Application No. 2017-005638, filed Jan. 17, 2017; No. 2017-098735, filed May 18, 2017, and No. 2017-210106, filed Oct. 31, 2017 are expressly incorporated by reference herein.

What is claimed is:
1. A control device comprising:
   a processor that is configured to execute computer-executable instructions so as to control a robot provided with a manipulator,
   wherein when the processor is configured to cause an end effector connected to the manipulator assemble a first object held by the end effector to a second object and a third object, the processor is configured to:
      cause the first object to come into contact with at least one of the second object and the third object;
      rotate the first object around a second rotation axis intersecting a first rotation axis while rotating the first object around the first rotation axis to assemble the second object and the first object to each other; and thereafter,
      rotate the first object around a third rotation axis intersecting the first rotation axis to assemble the third object and the first object to each other,
   wherein the processor is configured to cause to the end effector to assemble the first object to the second object and the third object by a force control based on an output from a force sensor connected to the manipulator, and wherein the processor is configured to perform the force control in a state where a target force in a rotation around the second rotation axis and a target force in a rotation around the third rotation axis are set to be smaller than a target force in an axial direction of the first rotation axis.

2. The control device according to claim 1, wherein the processor is configured to perform the force control in a state where a target force in an axial direction of the first rotation axis is set to a value other than 0 while rotating the first object around the first rotation axis.

3. The control device according to claim 2, wherein the processor is configured to perform the force control in a state where a target force in an axial direction of a fourth rotation axis intersecting the first rotation axis is set to a value other than 0 while rotating the first object around the first rotation axis.

4. The control device according to claim 1, wherein the processor is configured to perform the force control in a state where the target force in the rotation around the second rotation axis and the target force in the rotation around the third rotation axis are set to 0.

5. The control device according to claim 1, wherein when the processor is configured to change an axial direction of the first rotation axis to a direction after the assembling, the processor is configured to perform the force control in a state where a target force in an axial direction of a fifth rotation axis intersecting the first rotation axis is set to a value other than 0.

6. The control device according to claim 1, wherein when the processor is configured to cause the first object to come into contact with at least one of the second object and the third object, the processor is configured to cause the first object to come into contact with at least one of the second object and the third object in a posture in which the first object is inclined with respect to a posture after the first object is assembled.

7. A robot system comprising:
a robot provided with a manipulator;
a robot control device including a processor that is configured to execute computer-executable instructions so as to control the robot;
an end effector connected to the manipulator; and
a force sensor connected to the manipulator,
wherein when the processor is configured to cause the end effector to assemble a first object held by the end effector to a second object and a third object, the processor is configured to:
cause the first object to come into contact with at least one of the second object and the third object;
rotate the first object around a second rotation axis intersecting a first rotation axis while rotating the first object around the first rotation axis to assemble the second object and the first object to each other; and thereafter,
rotate the first object around a third rotation axis intersecting the first rotation axis to assemble the third object and the first object to each other,
wherein the processor is configured to cause to the end effector to assemble the first object to the second object and the third object by a force control based on an output from the force sensor, and
wherein the processor is configured to perform the force control in a state where a target force in a rotation around the second rotation axis and a target force in a rotation around the third rotation axis are set to be smaller than a target force in an axial direction of the first rotation axis.

8. The robot system according to claim 7, wherein the force sensor detects a force by a piezoelectric element.

9. The robot system according to claim 8, wherein the piezoelectric element is quartz.

10. The robot system according to claim 7, wherein the axial direction of the fourth rotation axis is a direction approaching the second object or the third object.

11. The robot system according to claim 7, wherein the second rotation axis is orthogonal to the first rotation axis.

12. The robot system according to claim 7, wherein the third rotation axis is orthogonal to the first rotation axis.

13. The robot system according to claim 7, wherein the first object, the second object, and the third object are gears.

14. The robot system according to claim 7, wherein the processor is configured to perform the force control in a state where a target force in an axial direction of the first rotation axis is set to a value other than 0 while rotating the first object around the first rotation axis.

15. The robot system according to claim 14, wherein the processor is configured to perform the force control in a state where a target force in an axial direction of a fourth rotation axis intersecting the first rotation axis is set to a value other than 0 while rotating the first object around the first rotation axis.

16. The robot system according to claim 7, wherein the processor is configured to perform the force control in a state where the target force in the rotation around the second rotation axis and the target force in the rotation around the third rotation axis are set to 0.

17. A control method of a robot for causing a processor to execute a process, the method comprising executing on the processor the steps of:
causing an end effector connected to a manipulator to hold a first object;
causing the first object held by the end effector to come into contact with at least one of a second object and a third object;
after the first object came into contact with the at least one of the second object and the third object, rotating the first object around a second rotation axis intersecting a first rotation axis while rotating the first object around the first rotation axis to assemble the second object and the first object to each other; and
after the first object was assembled with the second object, rotating the first object around a third rotation axis intersecting the first rotation axis to assemble the third object and the first object to each other,
wherein the processor is configured to cause to the end effector to assemble the first object to the second object and the third object by a force control based on an output from a force sensor connected to the manipulator, and
wherein the processor is configured to perform the force control in a state where a target force in a rotation around the second rotation axis and a target force in a rotation around the third rotation axis are set to be smaller than a target force in an axial direction of the first rotation axis.

18. The control method of a robot according to claim 17, wherein the processor is configured to perform the force control in a state where a target force in an axial direction of the first rotation axis is set to a value other than 0 while rotating the first object around the first rotation axis.

19. The control method of a robot according to claim 18, wherein the processor is configured to perform the force control in a state where a target force in an axial direction of a fourth rotation axis intersecting the first rotation axis is set to a value other than 0 while rotating the first object around the first rotation axis.

20. The control method of a robot according to claim 17, wherein the processor is configured to perform the force control in a state where the target force in the rotation around the second rotation axis and the target force in the rotation around the third rotation axis are set to 0.

* * * * *